United States Patent
Steffens et al.

(10) Patent No.: US 6,768,996 B1
(45) Date of Patent: Jul. 27, 2004

(54) SYSTEM AND METHOD FOR RETRIEVING AN ABSTRACTED PORTION OF A FILE WITHOUT REGARD TO THE OPERATING SYSTEM OF THE CURRENT HOST COMPUTER

(75) Inventors: Ricky A Steffens, Fort Collins, CO (US); Tomas G Wilkins, San Francisco, CA (US); Daniel B Ashbaugh, Loveland, CO (US); Michael D Krause, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/168,763

(22) Filed: Oct. 8, 1998

(Under 37 CFR 1.47)

(51) Int. Cl.[7] .............................................. G06F 17/30
(52) U.S. Cl. ............................ 707/102; 707/1; 707/10; 707/101; 707/201; 707/205
(58) Field of Search ................................ 707/1, 5, 501, 707/531, 102, 10, 101, 533, 526, 201, 205; 717/8

(56) References Cited

U.S. PATENT DOCUMENTS

| | | | | |
|---|---|---|---|---|
| 5,050,071 A | * | 9/1991 | Harris et al. ................... | 707/1 |
| 5,077,668 A | * | 12/1991 | Doi ............................. | 707/531 |
| 5,297,027 A | * | 3/1994 | Morimoto et al. .......... | 707/501 |
| 5,313,631 A | * | 5/1994 | Kao ............................ | 707/204 |
| 5,361,357 A | * | 11/1994 | Kionka ....................... | 717/151 |
| 5,404,513 A | * | 4/1995 | Powers et al. .............. | 707/102 |
| 5,590,331 A | * | 12/1996 | Lewis et al. ................. | 717/8 |
| 5,802,520 A | * | 9/1998 | Jerkunica et al. ........... | 707/101 |
| 5,905,979 A | * | 5/1999 | Barrows ....................... | 707/1 |
| 5,933,631 A | * | 8/1999 | Mealey et al. ................ | 713/2 |
| 5,937,418 A | * | 8/1999 | Ferris et al. ................. | 715/513 |
| 5,963,969 A | * | 10/1999 | Tidwell ....................... | 707/531 |
| 5,983,221 A | * | 11/1999 | Christy ........................ | 707/5 |
| 6,044,387 A | * | 3/2000 | Angiulo et al. .............. | 707/533 |
| 6,356,921 B1 | * | 3/2002 | Kumar et al. .......... | 707/501.01 |
| 6,360,236 B1 | * | 3/2002 | Khan et al. ................. | 715/526 |
| 6,519,597 B1 | * | 2/2003 | Cheng et al. ................. | 707/10 |

OTHER PUBLICATIONS

Griswold et al., "Fast, Flexible Syntactic Pattern Matching and Processing", IEEE, 1996, pp. 144–153.*

* cited by examiner

*Primary Examiner*—Thuy N. Pardo

(57) ABSTRACT

A universally available system and method are used to provide information to a system user as to the contents stored in a memory. In one embodiment, a CD ROM is used to store data thereon and the data is abstracted and the abstract is stored in a HTML file as a WEB page. The abstract file is then available for viewing by any browser without regard to the operating system of the host computer. Hot link buttons on the WEB page abstract allow a user to open a file from the WEB page. Audio and video abstracts can be added and the user can participate in the creation and selection of the abstract.

12 Claims, 2 Drawing Sheets

SYSTEM AND METHOD FOR RETRIEVING AN ABSTRACTED PORTION OF A FILE WITHOUT REGARD TO THE OPERATING SYSTEM OF THE CURRENT HOST COMPUTER

TECHNICAL FIELD OF THE INVENTION

This invention relates to storage, viewing and retrieval of documents in a computer system and more particularly to a system and method for abstracting documents upon their initial creation so that they may be reviewed and retrieved by a common protocol without regard to the operating system of the current host computer.

BACKGROUND OF THE INVENTION

The current state of the art involves a use model for CD's and DVD's very similar to those used with respect to a floppy disk. If the user wants to copy, archive, or back up any files to a CD, such functions are accessed through the operating system or host computer, either through a proprietary program, such as Explorer™ or through DOS Commands. If the user wants to view what is stored on a particular medium, the only alternative the user has to view the media using DOS Commands or Windows Explorer, traversing the file trees that are on the CD. Currently a user must use the interface given by the then host operating system to view any storage medium. This is not the most intuitive organizational pattern for most beginning or casual computer users. It is easy for users to get lost in the maze of directories, sub-directories and lists of file names in the hierarchical file system now used by DOS and Windows.

The current state of the art may work on low capacity media such as floppy disks, but the problem of finding information quickly is magnified when using high capacity media such as CD's or DVD's.

The current methods for file review are unintuitive and cumbersome. There is not a simple way to determine what is on a particular medium, and the user must go to a fairly low level operating system function to determine this information.

If the medium were to be placed on a computer with an operating system different from the operating system used to create the original file, the user would not be able to view the data, and there is a high likelihood that the user could not even determine what files were on the medium. Even assuming that the user could determine the file names, the user still would be unable to determine what information the files contained.

SUMMARY OF THE INVENTION

These and other objects, features and technical advantages are achieved by a system and method which abstracts each file when the file is created so that the user can view the contents graphically at any time without regard to the current operating system. In one embodiment, the abstract is created in a protocol, such as HTML, which can be used with the usual WEB browser. The abstract will also allow for annotations to be added to the script using text and/or recorded voice. These annotations allow the creator of the file to give some explanation of the file's contents or instructions to help the end user, without requiring the user to either access the data or to examine the file structure using the host computer's proprietary structure.

This will allow a user with any kind of internet search capabilities to display any files in a common or known way, saving the user from having to resort to low level functions in order to view the files or to traverse the structure that the files are in.

The system generated a wizard like interface with stepwise operation, which for ease of discussion, can be thought of as an HTML script, or utility. Each step of the HTML utility allows the data publisher (file creator) to customize how he or she wants the contents of the medium to be viewed. This is done not only by selecting what files will be physically copied to the medium but by also allowing the publisher to decide which files will be included or omitted from the display of the medium and in what format each file will be presented. This allows the publisher to hide "unimportant" or "support" files and concentrate on the intended purpose of the medium.

In one embodiment, there are pre-defined organizational layouts such as multimedia and document views. The pre-defined multimedia view will pick out only still graphics, sound and movie file types to display in the HTML script; all other files are considered support files and are omitted from the script. The next step in the process is annotating the view. The publisher, optionally, will be given the ability to record and/or type an annotation, which will be attached to the HTML script. After the annotation has been saved, the system will copy all the selected files and the HTML script to the storage media. The system will also create the autorun files to be used with Windows 95 and NT 4.0, or other operating systems, to allow the medium to automatically launch the user's WWW browser when the medium is inserted into the computer.

The HTML script is organized into a front page where the annotations are viewed and a hot link to the actual "view". Depending on which organizational view the publisher selected each file type will be organized in its own HTML script file. Each file in the view will be represented with a small (approx. 100×100 pixel) graphical thumbnail which will also serve as a hot link to the actual file.

When the medium is inserted into the drive on a system that supports autorun, the autorun will launch the default WWW browser with the HTML script on the media. The front page will appear which contains any textual annotations, and any audio annotation will automatically play. From the front page a hot link will take the user to the contents of the medium based on how the publisher chose to organize the data. Within the content view of the media the user will see "thumbnail" content previews of each file.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
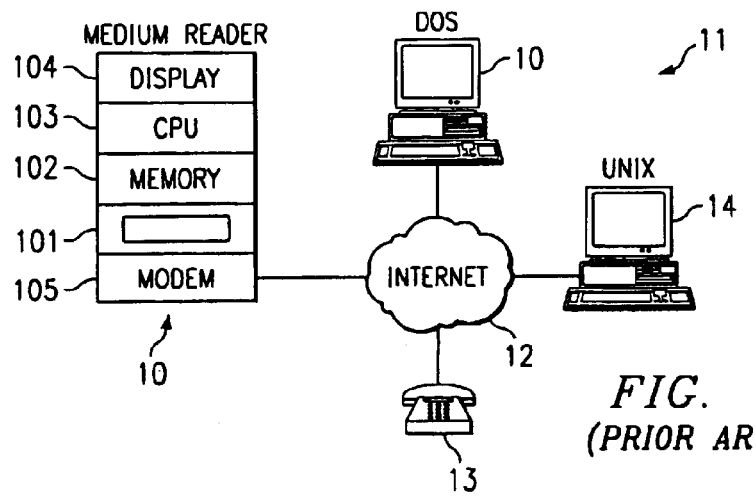
FIG. 1 shows a typical prior art computer network.

As shown in FIG. 1, the system is advantageously employed in prior art type systems, such as system 10, having memory 102, CPU 103, display 104 and a medium reader 101 which can read various portable memories, such as a CD-ROM memory or DVD-ROM (not shown). While not necessary, the system and method of this invention can be used with a modem or other communication transmission device, such as modem 105 or an Ethernet connection (not shown) to communicate with remote systems. This communication may be via internet 12 or could be via a LAN, a wide-area network, point to multipoint microwave, etc. The communication can be between computers 10 using like operating systems, for example the DOS operating system, or between a DOS based operating system and a UNIX based operating system, as shown with respect to PC 14, or the communication can be between a computer and a telephone, such as telephone 13. A portion of the communication connection may be the public switched telephone network.

Figure 2:
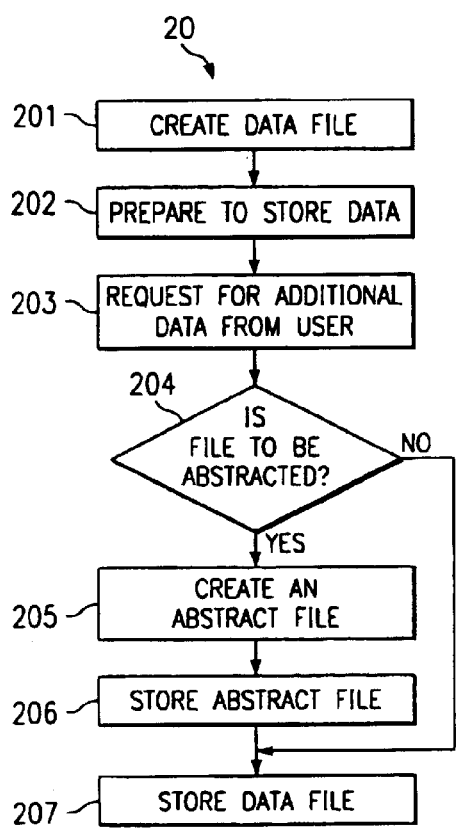
FIG. 2 show a flow diagram of the abstracting portion of the invention.

System and method 20 shown in FIG. 2 controls the creation and placement of information into a common abstract file which advantageously would be stored on the medium where the data is stored. However, this information could be stored in a data base common to many users and invoked when it is desired to see what is on a particular medium. This would be most helpful when the medium is not easily changeable, such with a CD-ROM.

Box 201 monitors the creation of a data file by a user or otherwise and, as determined by box 202, when the user is preparing to store the data, or after the data is stored upon the occurrence of a particular event, the user may be asked for additional data, such a voice file, an animation file, a pointer to another file, a brief abstract, etc. This additional data could be simply an inquiry as to whether the file is to be abstracted or not. A determination is made, box 204, by interaction with the user or otherwise, whether the file is to be abstracted or not. If it is not, then the original data filed is stored in the well-known manner.

Figure 3:
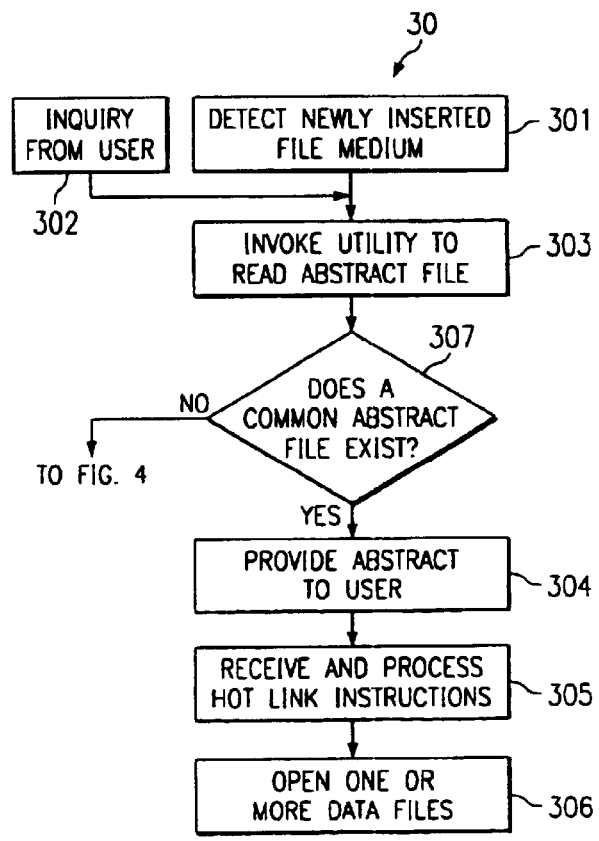
FIG. 3 shows a flow diagram of the display control portion of the invention.
Figure 4:
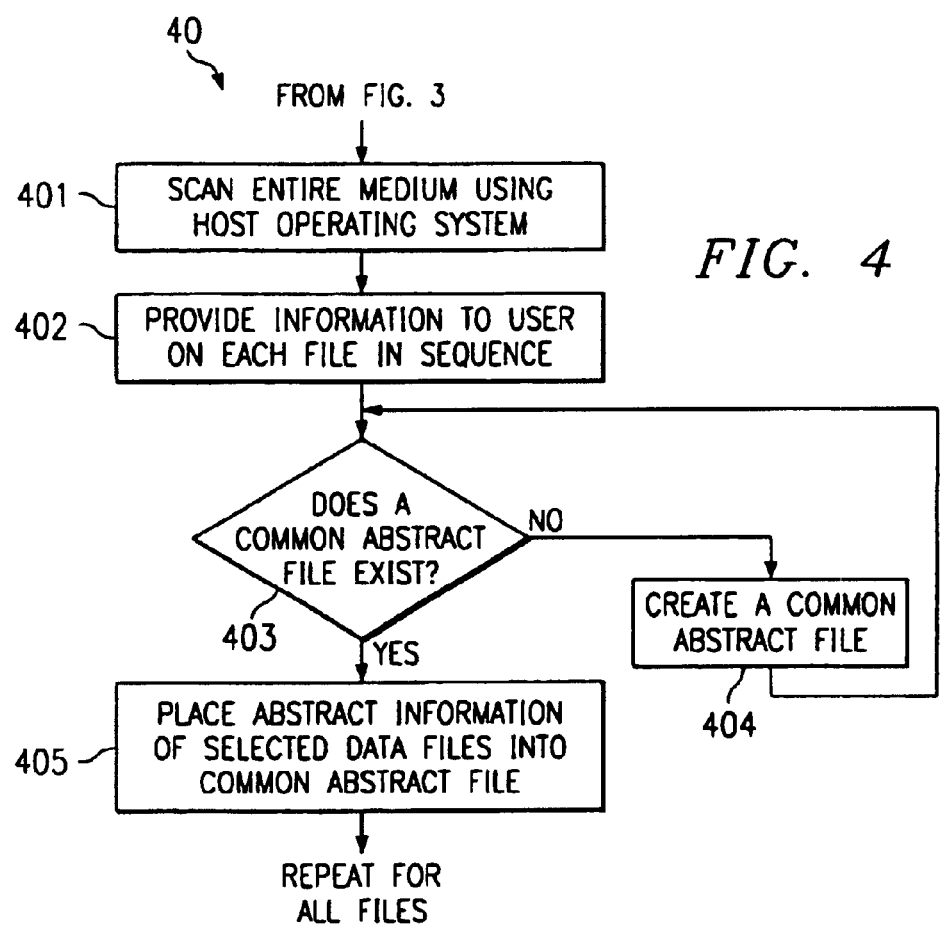
FIG. 4 shows a flow diagram of the creation of a common abstract file.

If an abstract is be created, box 205 formats the desired information for storage into the common abstract file, box 206, which has been created as shown in FIGS. 3 and 4. In one embodiment the file is created in HTML and formatted as a WEB page. The file can have hotlinks which will allow a user to open the file simply by clicking on the hotlink associated with the desired file.

Figure 5:
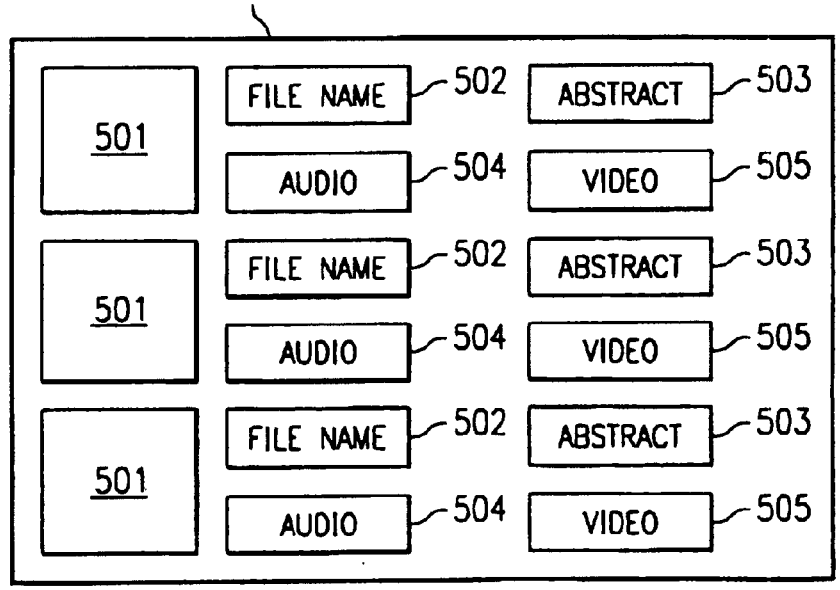
FIG. 5 shows a typical display page.

FIG. 5 shows a typical WEB page abstract of a number of files stored on a medium. Hotlink button 501 is associated with a file identification 502 which in turn is associated with a brief abstract 503. The abstract could have been generated from the text of the file, or from an understanding of the file's contents, from a profile of the file completed by the user, by a query answered by the user, or from information provided over the network connection. The hotlink button can also have associated therewith an audio portion 504 which can be played automatically or under control of the user and with a video portion 505 which likewise could be viewed automatically or upon command. Certainly, there could be more than one level of each type of message and the user could select the desired level.

A universally available system and method is used to provide information to a system user as to the contents stored in a memory. In one embodiment, a CD ROM is used to store data thereon and the data is abstracted and the abstract is stored in a HTML file as a WEB page. The abstract file is then available for viewing by any browser without regard to the operating system of the host computer. Hot link buttons on the WEB page abstract allow a user to open a file from the WEB page. Audio and video abstracts can be added and the user can participate in the creation and selection of the abstract.

Turning now to FIG. 3, in one embodiment Microsoft Explorer is the application that would run and control system 30. After an HTML file is created (FIG. 4), there is an auto run file written onto the CD so that when the CD is inserted, the operating system looks at it, box 303, and identifies whatever browser the user has, i.e.—Netscape, Microsoft Explorer, etc. The user can invoke the browser via box 302 and the information that the browser uses to display what is on the disk is in the HTML file as controlled by the common language and not be the constraints of the host operating system.

In operation, the currently available host File Manager is supplemented by a new user interface, called "browser interface." The objective is to make it easier for the user to find, look at and open files. Some host computers may have more than one operating system, or more than one read control system and the abstracted common file data would be able to be accessed by a user independent of any such operating system.

Because the system uses a browser, it can extract the first few lines of a file when the file name is displayed as an abstract to a user, box 304. This can be displayed, for example, to the right of the file name or somewhere else on the screen (as shown in FIG. 5) and will show some of the content of the file so that the user does not have to merely rely on file name, date created and his/her memory.

This file is actually written into the media itself so that a user can take any CD and put it on any computer without regard to operating system, and the user will see a familiar graphical display.

If the system runs the auto file and it looks for a browser on the host computer and cannot find it, one default could take the user to the File Manager interface or could just do nothing (as now done) and wait for user input instructions.

Turning now to FIG. 4, the system and method goes through the directory structure of the medium, box 401, as a user would do today using the existing host operating system. When a file is found, the system would place that file as an object inside of an HTML (or other common language) page. A mouse click will then either open the file or allow the user to go to the next directory and display the files that are in that directory. For example, suppose there are four files and one directory, and inside of that directory there resides three files, making a tree structure. The system views the first file and creates an HTML file if one does not exist, box 403. When the user starts a browser (as discussed with respect to FIG. 3), the browser looks at the HTML file and uses the information in the HTML file to decide what to display, box 402. A standard user interface appears at the top of the screen showing: forward, back, stop loading, etc. When file 1 appears, the system places script language into that file to identify the file and to display the file with a file name as shown in box 405. The system then traverses to the second file and repeats the same operation, continuing on through the first four files.

The directory is discovered and the system automatically puts the scripting language into the file which informs the user that it is a directory, and the action a user invokes when the Hot Link is clicked on is a display of whatever exists in that directory. Then, the system goes to the next level and finds files inside of that directory, and places them as discussed above.

When the user clicks on a file Hot Link, the file is opened using whatever application is associated with that file. If one file is a .DOC file, which is a work file, it would open that file for a DOC file The system first starts Word and opens the file inside of Word. If it is an Excel file or Lotus 1-2-3 file, it would start the appropriate application before loading the file. This is accomplished in the operating system by registering what file extensions are associated with which applications and using the file extensions to specify the applications and, where appropriate, the particular version thereof The objectives for storage are that once data is stored, it can be read for quite a while. One problem with prior art is that as the user moves up into more advanced operating systems, sometimes files cannot be read if those files were created with an older operating system. The belief in the industry is that the HTML will be around longer lasting than most operating systems.

If desired, the system could allow the user to annotate his/her files and the annotation can be used on the Hot Link display. One of the options a user has is to drag the lines to an audio play field and have the audio stored for play back with the Hot Link.

Although the present invention and its advantages have been described in detail, it should be understood that various changes, substitutions and alterations can be made herein without departing from the spirit and scope of the invention as defined by the appended claims.

What is claimed is:

1. A method for facilitating access to a plurality of files, said method comprising:
    creating a plurality of abstracts each corresponding to a file of said plurality of files that are stored on a medium;
    creating an abstract file storing said plurality of abstracts on said medium, wherein said abstract file comprises file link information usable in runtime to enable user access to a file of said plurality of files corresponding to each abstract of said plurality of abstracts;
    displaying two or more abstracts of said plurality of abstracts each in association with a file link provided in runtime using said file link information, wherein said displaying said two or more abstracts of said plurality of abstracts comprises automatically invoking a browser interface to operate with said abstract file upon insertion of said medium in a medium reader; and
    allowing a user to select and view a file corresponding to a particular abstract by invoking said file link.

2. The method of claim 1 wherein said abstract file comprises an operating system independent browser format.

3. The method of claim 2 wherein said file link information comprises browser executable hotlink information.

4. The method of claim 1 wherein said abstract file comprises link information usable in runtime to enable user access to a file corresponding to an abstract of said plurality of abstracts storing media content different than that of said plurality of files.

5. The method of claim 4 wherein said media content different than that of said plurality of files comprises an audio format.

6. The method of claim 4 wherein said media content different than that of said plurality of files comprises a video format.

7. A computer-readable medium comprising executable instructions for a file manager process, comprising:
    code for receiving identification of a file to be saved on a medium;
    code for querying a user whether the user desires to abstract said file, wherein said code for querying is operable in response to said code for receiving identification;
    code for receiving an abstract to be associated with said file when said user indicates that said file is to be abstracted;
    code for updating an abstract file to comprise said abstract as one of a plurality of abstracts each of which corresponds to a file of a plurality of files stored on said medium, wherein said abstract file comprises file link information operable to provide a file link associated with each said abstract when said abstract file is utilized with a user interface; and
    code for creating an auto-run file that is operable to invoke said user interface and to provide said abstract file to said user interface when said medium is inserted into a media drive;
    wherein said abstract file is operable to enable user access to selected files of said plurality of files when said abstract file is utilized with said user interface.

8. The computer-readable medium of claim 7, wherein said file is a text file, and wherein said process further comprises:
    code for selecting a portion of text from said file stored on said medium as said abstract.

9. The computer-readable medium of claim 7 further comprising:
    code for invoking said user interface when a user attempts to examine contents of said media.

10. A computer-readable medium comprising executable instructions for publishing content, comprising:
    code for identifying a plurality of files to be written to a medium;
    code for storing said plurality of files on said medium;
    code for identifying a subset of said plurality of files to be accessible by a user;
    code for receiving abstracts for ones of said subset of said plurality of files; and
    code for creating, on said medium, a browser interface file that includes said abstracts and associates file link information with each of said abstracts, wherein said file link information enables user access to corresponding ones of said subset of said plurality of files, without requiring direct user interaction with an operating system, when one of said abstracts is selected by a user via a browser interface, wherein said browser interface file is an auto-run file automatically invoked upon insertion of said medium in a media reader.

11. The computer-readable medium of claim 10 wherein said code for creating associates voice annotations describing corresponding ones of said plurality of files.

12. The computer-readable medium of claim 10 wherein said code for identifying a subset automatically identifies graphics, sound, and movie files to be accessible by said user.

* * * * *